US007132772B2

(12) United States Patent
Takeuchi et al.

(10) Patent No.: US 7,132,772 B2
(45) Date of Patent: Nov. 7, 2006

(54) ELECTRIC FAN FOR VEHICLE USE

(75) Inventors: Kazuhiro Takeuchi, Okazaki (JP);
Shinichi Oda, Okazaki (JP); Kenji Kumaki, Kosai (JP); Toshihiro Tanino, Kosai (JP); Shinya Suzuki, Kosai (JP)

(73) Assignees: DENSO Corporation, Kariya (JP);
Asmo Co., Ltd., Kosai (JP)

( * ) Notice: Subject to any disclaimer, the term of this patent is extended or adjusted under 35 U.S.C. 154(b) by 0 days.

(21) Appl. No.: 11/179,965

(22) Filed: Jul. 12, 2005

(65) Prior Publication Data

US 2006/0012256 A1    Jan. 19, 2006

(30) Foreign Application Priority Data

Jul. 13, 2004    (JP)    ............... 2004-205897

(51) Int. Cl.
*H02K 5/10* (2006.01)
*H02K 5/12* (2006.01)
*H02K 9/00* (2006.01)

(52) U.S. Cl. ............................ 310/88; 310/59; 310/62; 417/353; 417/369

(58) Field of Classification Search ................. 310/88, 310/62, 58, 59; 417/353, 369, 423.14
See application file for complete search history.

(56) References Cited

U.S. PATENT DOCUMENTS 2,157,191 A * 5/1939 Sinnett ........................ 310/62
5,071,322 A * 12/1991 Maekawa ................. 417/423.7
6,158,985 A * 12/2000 Watanabe et al. ....... 417/423.14
6,342,741 B1    1/2002 Fukui et al.
6,384,494 B1 * 5/2002 Avidano et al. ............... 310/58
6,551,074 B1 * 4/2003 Kudo et al. .................. 417/354
7,021,411 B1 * 4/2006 Maeda et al. ............... 180/68.4
2002/0025261 A1 * 2/2002 Kudo et al. .................. 417/354

FOREIGN PATENT DOCUMENTS

JP    9-074718    3/1997
JP    2000-333411    11/2000

* cited by examiner

*Primary Examiner*—Darren Schuberg
*Assistant Examiner*—Erik Preston
(74) *Attorney, Agent, or Firm*—Harness, Dickey & Pierce, PLC (57) ABSTRACT

The cooling air introducing port 24 is open to a lower portion of an axial direction end portion of the motor housing member 11, 12, the water-proof cover 25 for covering the cooling air introducing port 24 is attached to the outside of the axial direction end portion of the housing member 11, 12, and the air introducing passage 26 having a labyrinth structure is composed of the bent portion 25*d* provided in a lower end portion of the water-proof cover 25, the first wall face 21*d* provided in the annular portion 21*b* of the shroud and the second wall face 21*e*.

7 Claims, 5 Drawing Sheets

ELECTRIC FAN FOR VEHICLE USE

BACKGROUND OF THE INVENTION

1. Field of the Invention

The present invention relates to an electric fan used for moving air to a radiator of a vehicle. More particularly, the present invention relates to a structure for introducing cooling air into a motor for driving a fan.

2. Description of the Related Art

Concerning the device for introducing cooling air into a motor of an electric fan for vehicle use, the device described in the official gazette of JP-A-9-74718 is well-known.

According to the above patent document, cooling air introducing port, which is directed downward, is formed in an end portion of an end housing of a motor used for driving a fan. Further, first to the third labyrinth plates are provided in a passage from this cooling air introducing port to the inside of the motor.

The first labyrinth plate is contacted with and fixed to a cylindrical main body housing of the motor and directed in the direction substantially perpendicular to the horizontal direction when the motor is mounted on a vehicle. The second labyrinth plate is contacted with and fixed to the cylindrical main body housing on the inner side of the motor compared with the first labyrinth plate and extended in the substantially same direction as that of the first labyrinth plate. The third labyrinth plate is extended in the horizontal direction from the end housing to the inside of the motor.

According to the structure described in the above patent document, the labyrinth structure including the first to the third labyrinth plate is composed in a relatively short range in the neighborhood of the cooling air introducing port in the cylindrical main body housing of the motor. Therefore, water and dust flowing into the device together with cooling air cannot be sufficiently separated.

Therefore, in order to sufficiently separate water and dust from the cooling air, it is necessary to design a sectional area of a passage in the labyrinth structure to be small. As a result, the following problems may be encountered. The ventilating resistance of the labyrinth structure is increased, and a volume of the cooling air is decreased. Accordingly, the motor cooling performance is lowered.

SUMMARY OF THE INVENTION

The present invention has been accomplished to solve the above problems. It is an object of the present invention to make the action of separating water and dust from cooling air compatible with maintaining a volume of cooling air in an electric fan for vehicle use.

The present inventors have taken notice of the existence of a shroud (21) which fulfills a function of guiding a flow of air sent from a fan (16) in an electric fan device for vehicle use and also fulfills a function of a fixing member for fixing a motor (10) for driving the fan. The present invention has been devised to accomplish the above object by putting this shroud (21) into effective use.

In order to accomplish the above object, according to a first aspect of the present invention, there is provided an electric fan for vehicle use comprising:

a fan (16); a motor (10) for driving the fan (16); and a shroud (21) functioning as a guide for guiding air sent from the fan (16), wherein the shroud (21) has an annular portion (21b) located in an outer circumferential portion of the motor (10) and the annular portion (21b) is fixed to the motor (10), the electric fan for vehicle use further comprising:

cooling air introducing port (24) for introducing cooling air into a housing member (11, 12), formed in a lower portion of an end portion in the axial direction of the housing (11, 12) of the motor (10);

a water-proof cover (25) for covering the cooling air introducing port (24), arranged outside the axial direction end portion of the housing member (11, 12) while being separated from the cooling air introducing port (24) by a predetermined distance;

a bent portion (25d) formed at a lower end portion of the water-proof cover (25), extended downward from a lower end portion of the housing member (11, 12) by a predetermined distance and bent to the upstream side in the flow direction of the air which is sent;

a first wall face (21d) formed in the annular portion (21d), extended in the vertical direction of a vehicle in an upstream portion in the air flow direction by a predetermined distance from a forward end portion of the bent portion (25d);

a second wall face (21e) protruding from the first wall face (21d) downward by a predetermined distance with respect to the bent portion (25d) so that the second wall face (21e) can overlap the bent portion (25d); and an air introducing passage (26) having a labyrinth structure composed of the water-proof cover (25), the first wall face (21d) and the second wall face (21e) on the inlet side of the cooling air introducing port (24).

According to the invention, a first wall face (21d) provided in an annular portion (21b) of a shroud (21), a second wall face (21e) and a bent portion (25d) of a waterproof cover (25) comprise an air introducing passage (26) having a labyrinth structure is composed on an inlet side of cooling air introducing port (24), that is, outside of a housing member (11, 12).

Therefore, compared with the structure described in the above patent document in which the labyrinth structure is composed in a space inside the motor, the labyrinth structure can be formed in a remarkably large space. For the above reasons, when the passage length of the labyrinth structure is extended without especially reducing the sectional area of the passage of the labyrinth structure, water and dust contained in cooling air can be effectively separated and removed from the cooling air on the inlet side of the cooling air introducing port (24).

As it is unnecessary to especially reduce the sectional area of the passage in the labyrinth structure, the ventilating resistance of the labyrinth structure can be reduced to a relatively low value. As a result, it becomes possible to make the action of separating water and dust from the cooling air compatible with maintaining a volume of the cooling air of cooling the motor.

A first wall face (21d) on the shroud (21) side extends in the vertical direction of a vehicle, and the communication of an air introducing passage 26 in the labyrinth structure with an upstream side of the air flow direction A is shut off. Accordingly, there is no possibility that water and dust are pushed into the air introducing passage (26) by dynamic pressure (ram pressure) generated while a vehicle is running.

According to a second aspect of the present invention, in the first aspect of an electric fan for vehicle use, the bent portion (25d) is formed to be directed obliquely downward.

Due to the foregoing, water and dust, which are separated in the space inside a waterproof cover (25), can be smoothly discharged onto the inlet side of the air introducing passage 26 by an inclined face of a bent portion (25d) directed obliquely downward.

According to a third aspect of the present invention, in the first aspect of an electric fan for vehicle use, both the bent portion (25d) and the second wall face (21e) are formed to be directed obliquely downward.

Due to the foregoing, in addition to water and dust on the bent portion (25d), water and dust on the second wall face (21e) can be also easily discharged by the inclined face directed downward.

According to a fourth aspect of the present invention, in one of the first to third aspects of an electric fan for vehicle use, the overlapping length (L5) in the horizontal direction of the bent portion (25d) and the second wall face (21e) is not less than 3 mm.

According to the investigation made by the present inventors, the following was confirmed. When the overlapping length (L5) is set at 3 mm or more, water and dust can be effectively separated from cooling air by the action of the labyrinth structure.

According to a fifth aspect of the present invention, in one of the first to third aspects of an electric fan for vehicle use, a forward end position of the second wall face (21e) is made to be substantially the same as the position of the waterproof cover (25).

According to a sixth aspect of the present invention, in one of the first to fifth aspects of an electric fan for vehicle use, one end portion of a rotary shaft (15), which is integrated with a rotor (14) arranged in the housing member (11, 12), is protruded outside the housing member (11, 12), the fan (16) is connected to a protruding end portion (15a) of the rotary shaft (15) and the pressure in the neighborhood of the protruding end portion (15a) of the rotary shaft (15) becomes a negative pressure by an air blowing action of the fan (16), an exhaust port (11f) is open to a portion of the housing member (11, 12) on one end side of the rotary shaft (15), and the cooling air introducing port (24) is open to a portion of the housing member (11, 12) on the other end side of the rotary shaft (15).

As described above, in the electric fan device for vehicle use in which an exhaust port (11f) is open in a portion on one end side of a rotary shaft (15) in a housing member (11, 12) and cooling air introducing port (24) is open in a portion on the other end side of the rotary shaft (15) in the housing member (11, 12), the present invention can be preferably executed.

Incidentally, the reference numerals in parentheses, to denote the above means, are intended to show the relationship of the specific means which will be described later in an embodiment of the invention.

The present invention may be more fully understood from the description of preferred embodiments of the invention set forth below, together with the accompanying drawings.

DESCRIPTION OF THE PREFERRED EMBODIMENTS

Figure 1:
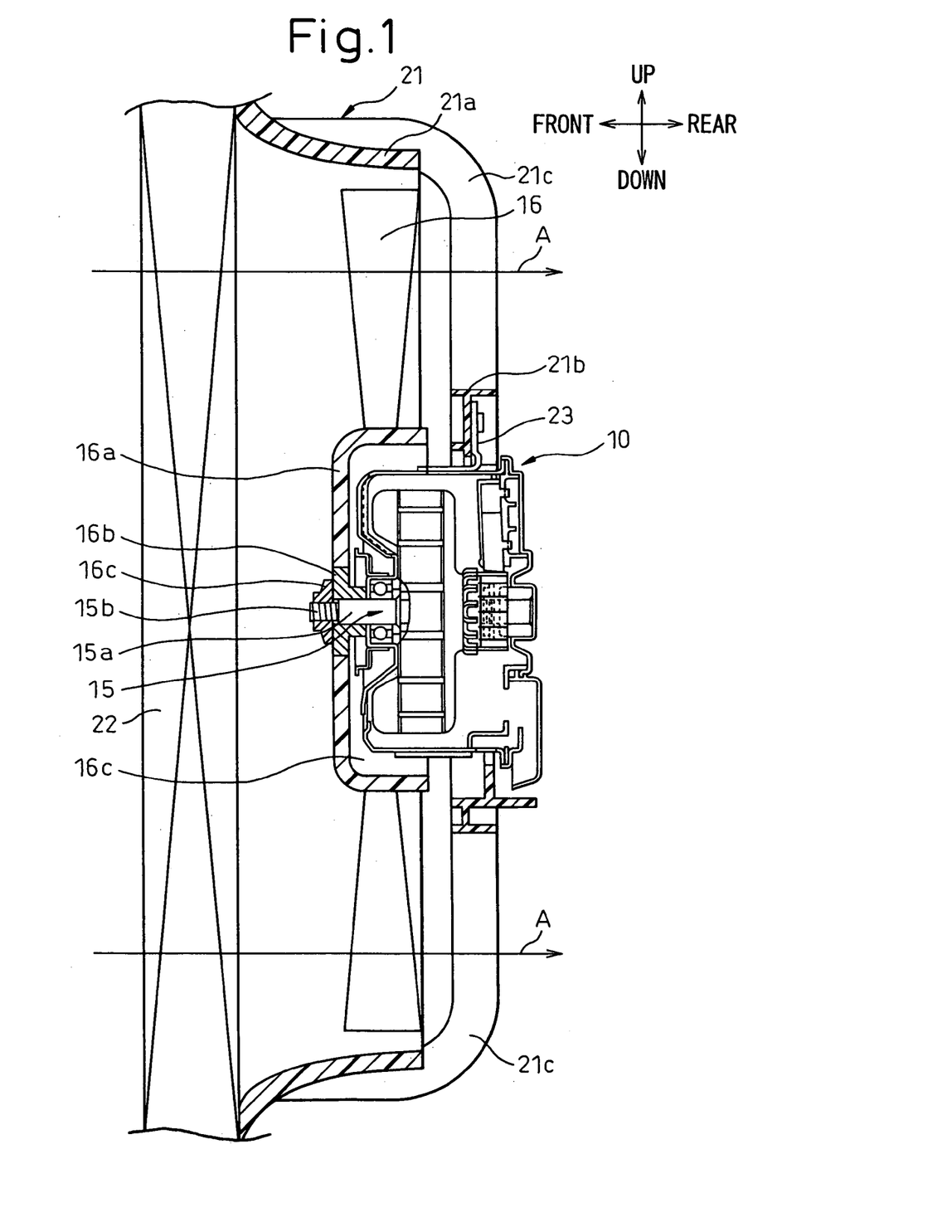
FIG. 1 is a sectional view showing an entire arrangement of the electric fan device for vehicle use of the first embodiment of the present invention.
Figure 2:
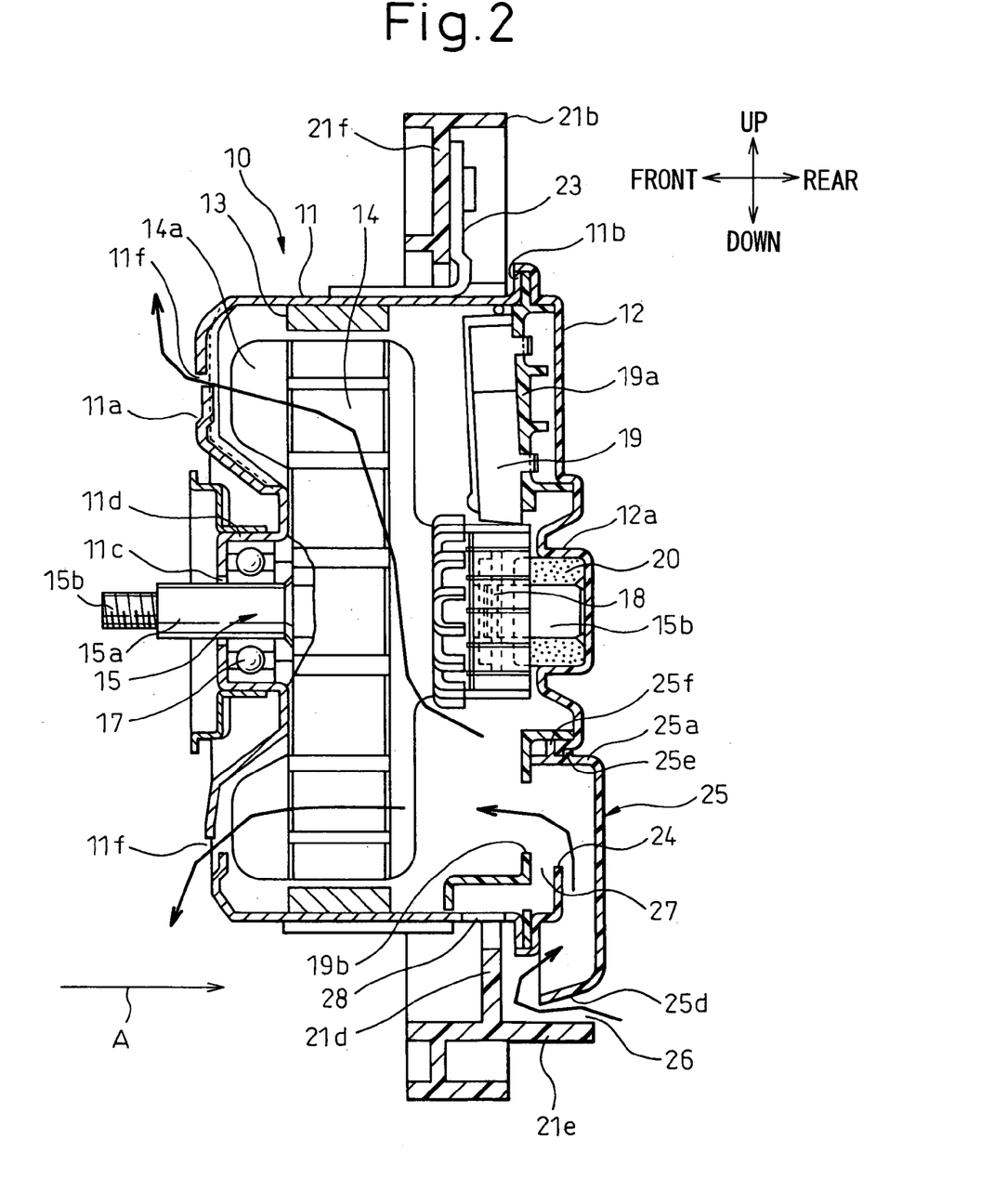
FIG. 2 is an enlarged sectional view of the motor portion of FIG. 1.
Figure 3:
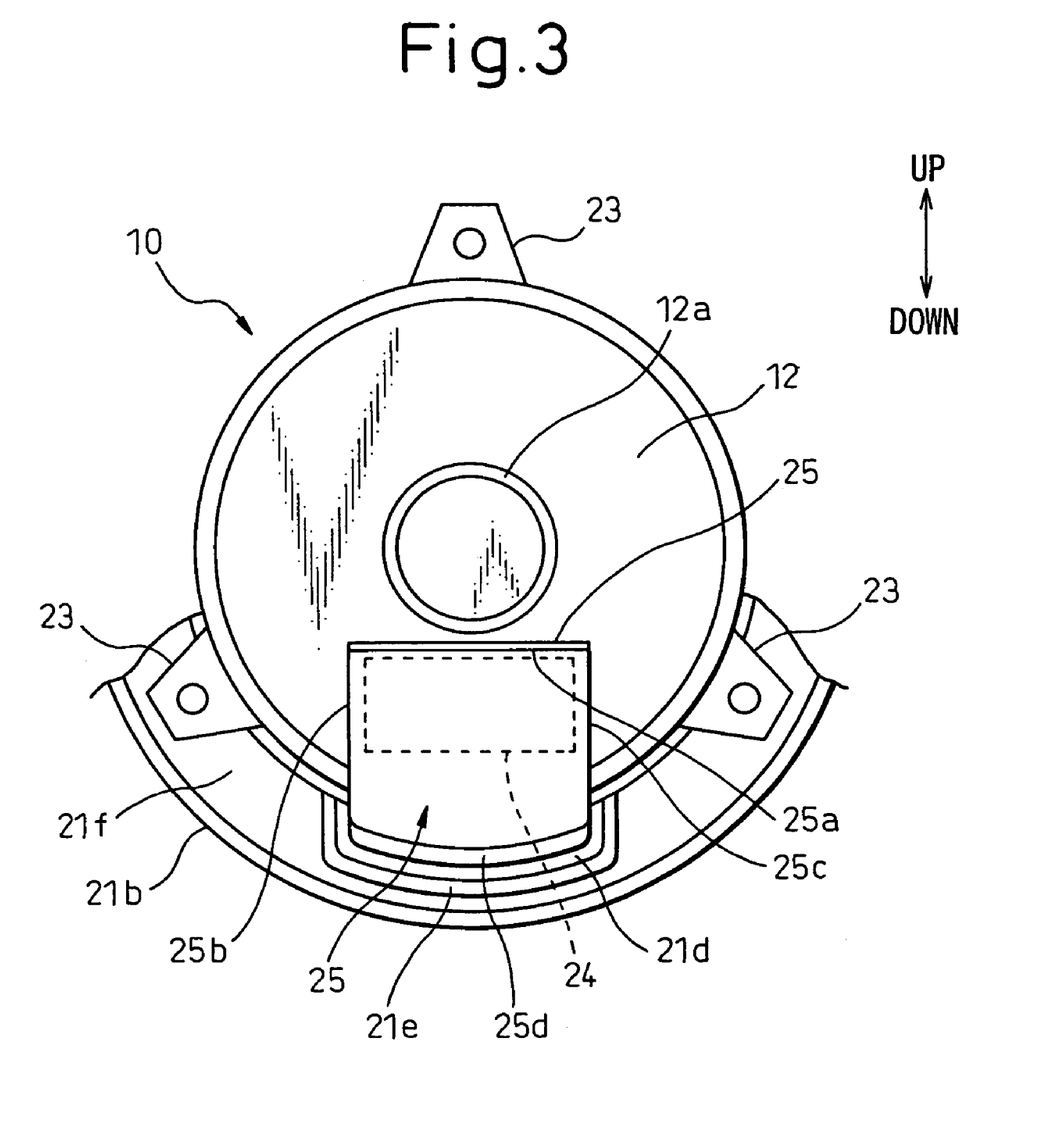
FIG. 3 is a right side view of FIG. 2.
Figure 4:
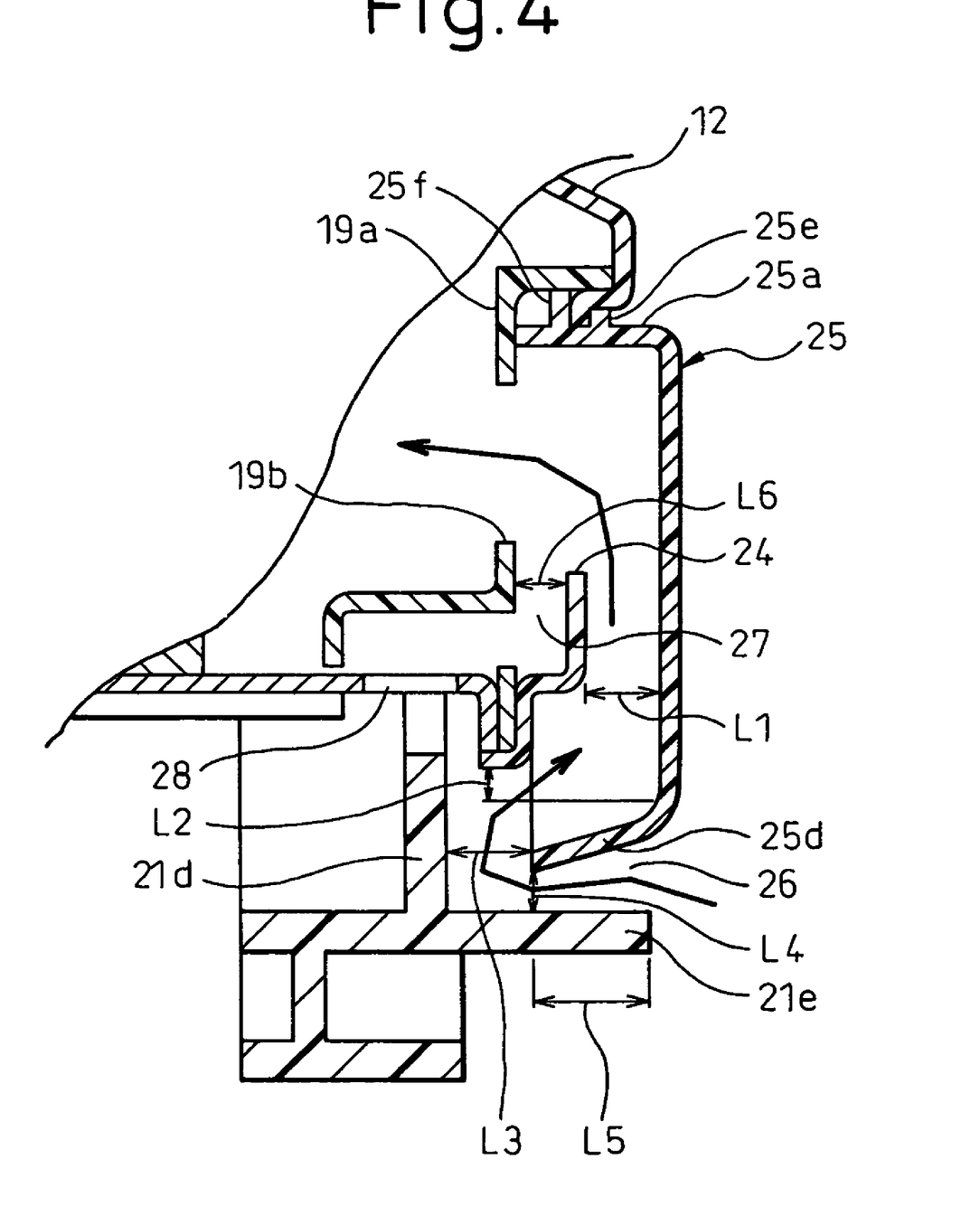
FIG. 4 is an enlarged view showing a primary portion of FIG. 2.

First of all, a first embodiment of the present invention will be explained below. FIGS. 1 to 4 are views showing the first embodiment of the present invention. FIG. 1 is a sectional view showing an entire arrangement of the electric fan device for vehicle use of the first embodiment of the present invention, FIG. 2 is an enlarged sectional view of the motor portion of FIG. 1, FIG. 3 is a right side view of FIG. 2, and FIG. 4 is an enlarged view showing a primary portion of FIG. 2. In this connection, the arrows of up, down, front and rear in the drawings indicate the directions in the case where the electric fan for vehicle use of the invention is mounted on a vehicle.

In FIGS. 1 and 2, the motor 10 for driving a fan is mounted on a vehicle so that the axial direction of the fan can be directed in the longitudinal direction (the horizontal direction) of the vehicle. The motor 10 for driving a fan includes a cylindrical body housing 11 made of iron which is generally referred to as a yoke housing. On one end side (on the left in the drawing) in the axial direction of this cylindrical body housing 11, the bottom face wall portion 11a is integrally formed. On the other end side (on the right in the drawing) in the axial direction of this cylindrical body housing 11, the opening end portion 11b is provided.

To this opening end portion 11b (the other end portion in the axial direction of the cylindrical body housing 11), the disk-shaped end housing 12 is fixed so that it can cover this opening end portion 11b. This end housing 12 is usually made of resin, however, it may be made of metal (for example, iron).

The stator 18 composed of annular magnets is fixed onto an inner circumferential face of the cylindrical body housing 11. On the inner circumferential side of the stator 13, the armature 14 having coils 14a is pivotally arranged concentrically with the stator 13. At the center of this armature 14, the rotary shaft 15 is integrally provided.

One end side (the left in the drawing) of this rotary shaft 15 penetrates the through-hole 11c formed at the center of the bottom face wall portion 11a and protrudes outside the bottom face wall portion 11a. At the center of the disk-shaped boss portion 16a of the axial flow type fan 16, the annular insert part 16b made of metal is integrally provided by means of insert molding. The central hole portion of this annular insert part 16b is engaged with the protruding end portion 15a of the rotary shaft 15 in such a manner that the central hole portion of this annular insert part 16b, the shape of which is non-circular, is engaged with the protruding end portion 15a of the rotary shaft 15, the shape of which is also non-circular so that the central hole portion and the protruding end portion cannot be relatively rotated. When the nut 16c is screwed to the forward end male screw portion 15b of the protruding end portion 15a, the rotary shaft 16 and the disk-shaped boss portion 16a of the fan 16 are integrally connected with each other.

The axial flow type fan 16 and the disk-shaped boss portion 16a are formed out of resin by means of integral molding. In this embodiment, when the axial flow type fan 16 is rotated by the motor 10, air can be sent in the direction of arrow A in FIGS. 1 and 2.

One end side (the left in the drawing) of the rotary shaft 15 is pivotally supported by the bearing 17 provided in the central cylinder portion 11d of the bottom face wall portion 11a. The exhaust port 11f is formed in a portion of the bottom face wall portion 11a on the outer circumferential side with respect to the central cylinder portion 11d. From this exhaust port 11f, air is discharged from the inside of the motor to the outside. Specifically, air is discharged from the inside of the motor to the inner region 16c of the disk-shaped boss portion 16a of the fan 16. A plurality of exhaust ports 11f are provided at regular intervals in the circumferential direction of the bottom face wall portion 11a.

On the other hand, on the other end side (on the right in the drawing) of the rotary shaft 15, the commutator 18 is provided, and the brush device 19 comes into sliding contact with this commutator 18. The brush device 19 is held by the disk-shaped brush holding plate 19a. The brush holding plate 19a is made of resin. The outer circumferential edge portion of this brush holding plate 19a is interposed and fixed between the opening end portion 11b of the cylindrical body housing 11 and the end housing 12.

The other end portion 15b of the rotary shaft 15 is pivotally supported by the bearing 20 provided in the central cylindrical portion 12a of the end housing 12. This motor constitution is a well known technique. Therefore, the detailed explanations of the motor constitution are omitted here.

In FIG. 1, the shroud 21 is a member made of resin attached to the radiator 22. The shroud 21 functions as a guide for guiding a flow of air sent from the axial flow type fan 16. Further, the shroud 21 functions as a fixing member to fix the motor 10 for driving the fan.

This shroud 21 includes: an outer circumferential side annular portion 21a located on the outer circumferential side of the fan 16; and an inner circumferential side annular portion 21b located on the downstream side of the fan 16 in the neighborhood of the inner circumferential end the fan 16. The outer circumferential side annular portion 21a and the inner circumferential side annular portion 21b are integrally connected to each other by a plurality of arm portions 21c radially arranged between the outer and inner circumferential annular portions. The portions 21a to 21c are formed, out of resin, by integral molding.

On the other hand, a plurality of bracket members 23 are fixed onto the outer circumferential face of the cylindrical body housing 11 in the circumferential direction at predetermined intervals. The bracket members 23 are fixed to the inner circumferential side annular portion 21b of the shroud 21 by means of fastening such as screws. In this way, the entire motor 10 including the fan 16 can be supported and fixed to the shroud 21.

The cooling air introducing port 24 is formed in a lower portion of the end housing 12. In this embodiment, as shown in FIG. 3, this cooling air introducing port 24 is formed into a rectangle which is long from side to side. With respect to the end housing 12, the water-proof cover 25 is arranged at a position in the outer portion of this cooling air introducing port 24 while being separate by a minute distance L1 (shown in FIG. 4). In this case, for example, the distance L1 is set at 5 to 8 mm.

This water-proof cover 25 is a member made of resin. This water-proof cover 25 is formed into a box-shape having walls which are bent from the peripheral portion of the rectangular plane, which is opposed to the cooling air introducing port 24, toward the cooling air introducing port 24 side.

Specifically, the water-proof cover 25 includes: an upper face wall portion 25a formed along the upper edge portion of the cooling air introducing port 24; and a right 25c and a left side wall portion 25b (shown in FIG. 3) formed along the right and left edge portion of the cooling air introducing port 24.

Further, the lower end portion of the water-proof cover 25 extends downward from the lower end portion of the end housing 12 by a predetermined distance L2 (shown in FIG. 4). From this position, the lower end portion of the water-proof cover 25 is bent to the upstream side in the air flow direction A so that the bent portion 25d can be formed. In this embodiment, this bent portion 25d is formed to be directed obliquely downward with respect to the horizontal face. In the circumferential direction of the end housing 12, this bent portion 25d is formed into an arcuate-shape (shown in FIG. 3) along the outer circumference of the end housing 12.

On the other hand, the first wall face 21d is integrally formed in a portion opposed to the water-proof cover 25 on the lower side of the cylindrical body housing 11 in the inner circumferential side annular portion 21b of the shroud 21. This first wall face 21d is a wall face extending in the vertical direction of the vehicle, in other words, extending in the radial direction of the motor.

On the annular wall face extending in the vertical direction of the vehicle formed in the inner circumferential side annular portion 21b, only the first wall face 21d is formed so that the first wall face 21d can come closer to the opening end portion 11b side of the cylindrical body housing 11 than the wall face 21f of the other portion. Due to the foregoing, the first wall face 21d is opposed to the forward end portion of the bent portion 25d on the lower end side of the water-proof cover 25 while being separate by a predetermined minute distance L3 (shown in FIG. 4).

The second wall face 21e, which protrudes downward from the first wall face 21d by a predetermined distance L4 (shown in FIG. 4) with respect to the forward end portion of the bent portion 25d, is formed in the inner circumferential side annular portion 21b. This second wall face 21e is formed into a shape which protrudes in the horizontal direction from the first wall face 21d to the downstream side of the air flow, and the forward end portion of the second wall face 21e is located at the substantially same position as the position of the rectangular plane portion extending in the vertical direction of the water-proof cover 25.

In the same manner as that of the bent portion 25d, the second wall face 21e is formed into an arcuate-shape (shown in FIG. 3) along the outer circumference of the end housing 12.

In this connection, in the present embodiment, the overlapping length L5 (shown in FIG. 4) of the second wall face 21e and the bent portion 25d of the water-proof cover 25 is set at about 10 mm. Distances L2, L3 and L4 are approximately the same as the distance L1.

On the inlet side of the cooling water introducing port 24, the air introducing passage 26 having a labyrinth structure is composed of the water-proof cover 25, the first wall face 21d provided on the shroud 21 side and the second wall face 21e.

As shown in FIG. 2, one portion on the forward end side of the upper face wall portion 25a of the water-proof cover 25 is inserted from the cooling air introducing port 24 into the inside of the end housing 12. The upper edge portion (the opening edge portion of the end housing 12) of the cooling air introducing port 24 is elastically pressed and held by two protruding pieces 25e, 25f protruding from the upper face wall portion 25a to the upper side.

Due to the foregoing, the water-proof cover 25 is attached to the end housing 12. In this case, the forward end portions of the right 25c and the left side wall portion 25b are tightly contacted with the surface of the end housing 12.

The disk-shaped brush holding plate 19a is arranged in the inner portion of the end housing 12 distant from the cold air introducing port 24 by a predetermined distance. On this brush holding plate 19a, the opening portion 19b is open while being opposed to the cooling air introducing port 24 of the end housing 12. The shape of the opening portion 19b is also formed into a rectangle along the cooling air introducing port 24.

The predetermined distance L6 (shown in FIG. 4), which is substantially the same as the distance L1, is provided between the opening portion 19b of the brush holding plate 19a and the cooling air introducing port 24 of the end housing 12. In the lower side portion between the brush holding plate 19a and the end housing 12, the water separating space 27 is formed when this predetermined distance L6 is set. In the lowermost portion of this water separating space 27, that is, in the lowermost portion of the cylindrical body housing 11, the opening portion 28 for draining is formed.

In this connection, in the present embodiment, the opening portion 28 for draining is open at the substantially same position as the position of the first wall face 21d in the axial direction of the cylindrical body housing 11.

Next, the operation of the present embodiment will be explained below. When an electric current is supplied to the motor 10 and the motor 10 (the armature 14) is rotated, the fan 16 is driven in rotation by the motor 10. Due to the foregoing, air (outside air) passing through the radiator 22 is forcibly sent in the direction of arrow A. Accordingly, heat exchange is conducted between the cooling water for cooling the engine circulating in the radiator 22 and the air sent from the fan, so that the engine cooling water can be cooled.

In this connection, in the inner region 16c of the disk-shaped boss portion 16a of the fan 16, an air sucking action is generated due to the air blowing action of the fan 16. Therefore, this inner region 16c becomes a negative pressure portion. For this reason, the pressure in the inner space of the motor 10 becomes negative through the exhaust port 11f.

As a result, cooled air is introduced into an inner space of the motor 10 via the air introducing passage 26 having a labyrinth structure→the inner space of the water-proof cover 25→the cooled air introducing port 24→the water separating space 27. This flow of cooling air passes through a gap portion between the armature 14 and the stator 13 so as to cool the inner mechanism of the motor 10. Then, the flow of cooling air is discharged from the exhaust port 11f into the inner region 16c of the disk-shaped boss portion 16a.

In this connection, according to the present embodiment, the air introducing passage 26 having a labyrinth structure is composed by the water-proof cover 25, the first wall face 21d provided on the shroud 21 side and the second wall face 21e on the inlet port side of the cooling air introducing port 24. Therefore, the air introducing passage 26 having a labyrinth structure is composed outside the motor housing. 11, 12.

For the above reasons, compared with the constitution in which the labyrinth structure is composed in the inner space of the motor as described in the above patent document, there is an enough room for the labyrinth structure in the present embodiment. Accordingly, water and dust contained in the flow of cooling air can be effectively separated and removed on the inlet port side of the cooling air introducing port 24 by increasing the passage length of the labyrinth structure without especially reducing the sectional area of the passage of the labyrinth structure.

As it becomes unnecessary to especially reduce the sectional area of the passage in the labyrinth structure, the ventilating resistance of the labyrinth structure can be relatively small. As a result, it becomes possible to make the separating action of water and dust compatible with maintaining a volume of cooling air for cooling the motor.

As the first wall face 21d of the shroud 21 extends in the vertical direction (the radial direction of the motor) of the vehicle and the communication of the air introducing passage 26 of the labyrinth structure with the upstream side of the air flow direction A is shut off, there is no possibility that water and dust are pushed into the air introducing passage 26 by the dynamic pressure (the ram pressure) generated when the vehicle is running. As the inlet portion of the air introducing passage 26 is open only to the downstream side of the air flow direction A, there is no possibility that water and dust are pushed into the inlet portion of the air introducing passage 26 by the dynamic pressure generated when the vehicle is running.

In the present embodiment, as the bent portion 25d on the lower end side of the water-proof cover 25 is formed in such a manner that it is directed obliquely downward, water and dust separated in the inner space of the water-proof cover 25 can be smoothly discharged to the inlet port side of the air introducing passage 26 by the inclined face of this bent portion 25d.

Water and dust separated in the water separating space 27 are discharged outside the motor from the opening portion 28 for draining which is open to the lowermost portion.

In this connection, in the air introducing passage 26, the length L5 of the overlapping portion, in which the bent portion 25d composing the labyrinth structure inlet portion and the second wall face 21e overlap each other, greatly affects the separating action of separating water and dust. In the present embodiment, the length L5 of this overlapping portion is set at 10 mm. However, according to the investigation made by the present inventors, it is preferable that the length L5 of the overlapping portion is set at at least 3 mm or more so that water and dust can be completely separated.

Figure 5:
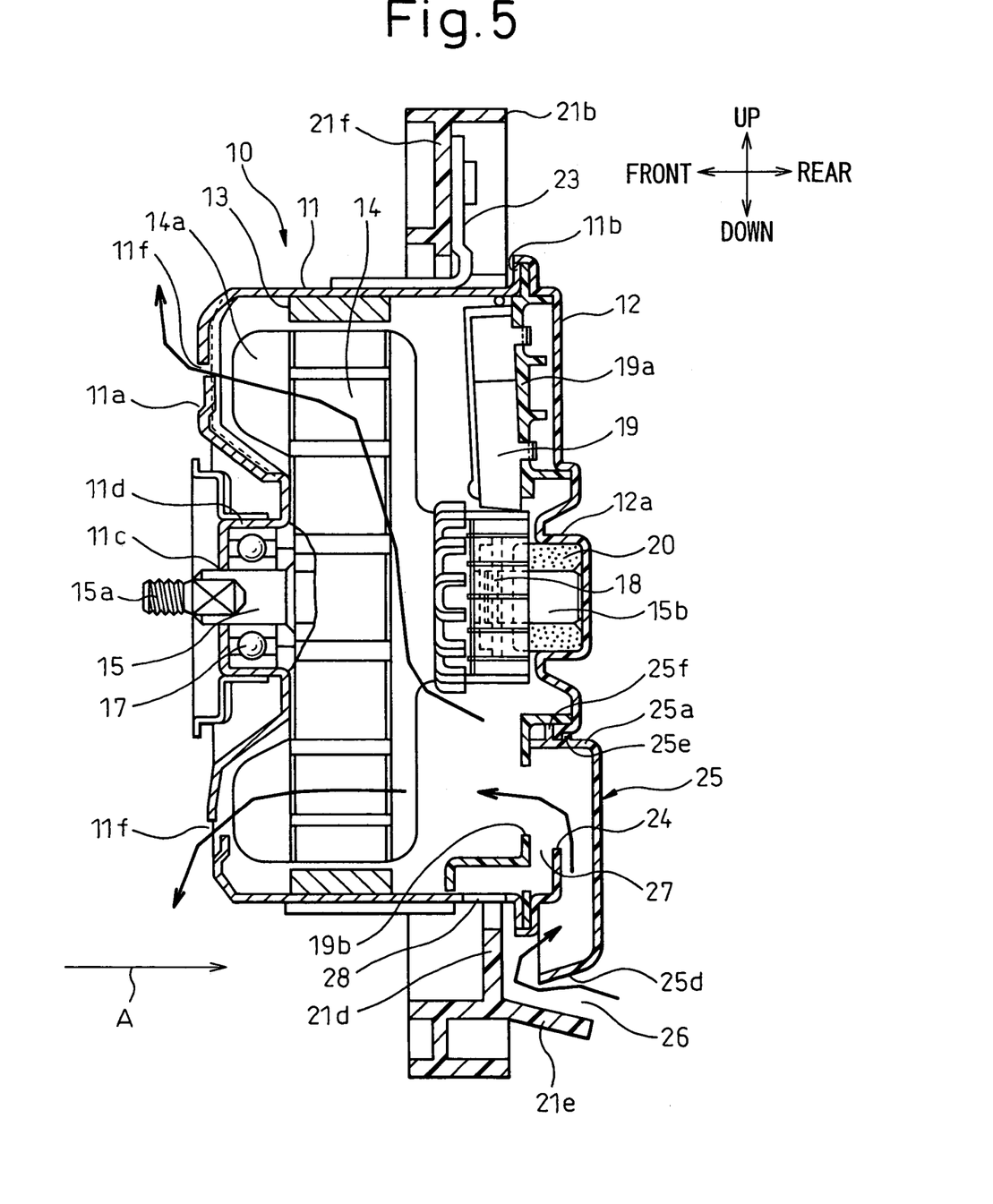
FIG. 5 is an enlarged sectional view of the motor portion showing the second embodiment of the present invention.

Next, a second embodiment will be explained below. FIG. 5 is a view showing the second embodiment. The bent portion 25d on the lower end side of the water-proof cover 25 is formed to be directed obliquely downward. Further, the second wall face 21e provided in the inner circumferential side annular portion 21b of the shroud 21 is also formed to be directed obliquely downward.

Due to the above structure, in addition to the water and dust attached on the bent portion 25d, the water and dust attached on the second wall face 21e can be also easily discharged by the inclined face which is inclined downward.

Finally, another embodiment will be explained below. In the above embodiment, when the upper edge portion (the opening edge portion of the end housing 12) of the cooling air introducing port 24 is elastically pressed and held by two protruding pieces 25e, 25f which protrude upward from the upper face wall portion 25a of the water-proof cover 25, the water-proof cover 25 is attached to the end housing 12. However, when a plurality of engaging pawls extending onto the outer face of the end housing 12 are formed on the water-proof cover 25, the engaging hole portions at the forward end portions of these engaging pawls may be engaged with the engaging protruding portions on the outer face of the end housing 12 so that the water-proof cover 25 can be attached to the end housing 12.

In the first embodiment, the bent portion 25d on the lower end side of the water-proof cover 25 is formed to be directed obliquely downward. However, this bent portion 25d may be formed to be substantially horizontal.

While the invention has been described by reference to specific embodiments chosen for purposes of illustration, it should be apparent that numerous modifications could be made thereto by those skilled in the art without departing from the basic concept and scope of the invention.

The invention claimed is:

1. An electric fan for a vehicle comprising:
a fan; a motor for driving the fan; and a shroud functioning as a guide for guiding air sent from the fan, wherein
the shroud has an annular portion located in an outer circumferential portion of the motor and the annular portion is fixed to the motor,
the electric fan for the vehicle further comprising:
a cooling air introducing port for introducing cooling air into a housing member of the motor, formed in a lower portion of an end portion in an axial direction of the housing member of the motor;
a water-proof cover for covering the cooling air introducing port, arranged outside the axial direction end portion of the housing member while being separated from the cooling air introducing port by a predetermined distance;
a bent portion formed at a lower end portion of the water-proof cover, extended downward from a lower end portion of the housing member by a predetermined distance and bent to an upstream side in a flow direction of the air sent from the fan;
a first wall face formed in the annular portion extending in a vertical direction of the vehicle, the first wall face being located at the upstream side in the flow direction of the air by a predetermined distance from a forward end portion of the bent portion;
a second wall face, at a lower position by a predetermined distance with respect to the bent portion, protruding from the first wall face so that the second wall face overlaps the bent portion in the axial direction of the housing; and
an air introducing passage having a labyrinth structure, the labyrinth structure being defined by the water-proof cover, the first wall face and the second wall face on an inlet side of the cooling air introducing port.

2. An electric fan for vehicle use according to claim 1, wherein the bent portion is formed to be directed obliquely downward.

3. An electric fan for vehicle use according to claim 1, wherein both the bent portion and the second wall face are formed to be directed obliquely downward.

4. An electric fan for vehicle use according to claim 1, wherein the overlapping length in the horizontal direction of the bent portion and the second wall face is not less than 3 mm.

5. An electric fan for vehicle use according to claim 1, wherein an end position of the second wall face is made to be substantially the same as the position of the water-proof cover.

6. An electric fan for vehicle use according to claim 1, wherein
one end portion of a rotary shaft, which is integrated with a rotor arranged in the housing member, is protruded outside the housing member,
the fan is connected to a protruding end portion of the rotary shaft and the pressure in the neighborhood of the protruding end portion of the rotary shaft becomes a negative pressure by an air blowing action of the fan,
an exhaust port is open to a portion of the housing member on one end side of the rotary shaft, and
the cooling air introducing port is open to a portion of the housing member on the other end side of the rotary shaft.

7. An electric fan for a vehicle, the electric fan comprising:
a fan defining a rotational axis;
a motor for driving the fan; and
a shroud for guiding air sent from the fan, the shroud having an annular portion fixed to the motor;
a cooling air introducing port for introducing cooling air into a housing member of the motor, the cooling air introducing port being formed in a lower portion at an axial end of the housing member of the motor;
a first wall face formed in the annular portion of the shroud, the first wall face extending in a direction generally perpendicular to the rotational axis;
a second wall face protruding from the first wall face in a direction generally parallel to the rotational axis;
a water-proof cover covering the cooling air introduction port, the water-proof cover being separated from the cooling air introduction port by a predetermined distance in the direction generally parallel to the rotational axis;
a bent portion formed at a lower end of the water-proof cover, the bent portion being bent to an upstream side in a flow direction of the air sent from the fan, the bent portion being spaced from the first wall in the direction generally parallel to the rotational axis, the bent portion being spaced from the second wall face in the direction generally perpendicular to the rotational axis, the bent portion overlapping the second wall face in the direction generally parallel to the rotational axis; and
an air introduction passage having a labyrinth structure, the labyrinth structure being defined by the water-proof cover, the first wall face and the second wall face on an inlet side of the cooling air introduction port.

* * * * *